(12) United States Patent
Shiflett et al.

(10) Patent No.: US 8,506,839 B2
(45) Date of Patent: Aug. 13, 2013

(54) ABSORPTION CYCLE UTILIZING IONIC LIQUIDS AND WATER AS WORKING FLUIDS

(75) Inventors: Mark Brandon Shiflett, Wilmington, DE (US); Akimichi Yokozeki, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 667 days.

(21) Appl. No.: 11/637,469

(22) Filed: Dec. 12, 2006

(65) Prior Publication Data

US 2007/0144186 A1    Jun. 28, 2007

Related U.S. Application Data

(60) Provisional application No. 60/750,196, filed on Dec. 14, 2005.

(51) Int. Cl.
  *C09K 5/00* (2006.01)
  *C09K 5/04* (2006.01)
  *F25B 15/00* (2006.01)
  *F25B 41/00* (2006.01)
  *F25B 17/00* (2006.01)

(52) U.S. Cl.
  USPC ............ 252/67; 252/69; 62/236; 62/196.1; 62/483; 62/476; 62/112; 210/634; 210/637; 210/638; 422/129; 422/198; 422/234; 422/242; 422/256

(58) Field of Classification Search
  USPC ............... 252/67, 69; 62/236, 196.1, 483, 62/476, 112; 210/634, 637, 638; 422/129, 422/198, 234, 242, 256
  See application file for complete search history.

(56) References Cited

U.S. PATENT DOCUMENTS

| | | | |
|---|---|---|---|
| 4,388,812 A | 6/1983 | Clark | |
| 5,709,092 A | 1/1998 | Shiflett | |
| 6,155,057 A | 12/2000 | Angell | |
| 6,288,135 B1 * | 9/2001 | Bement et al. | 521/174 |
| 6,339,182 B1 | 1/2002 | Munson | |
| 6,579,343 B2 | 6/2003 | Brennecke | |
| 7,208,605 B2 | 4/2007 | Davis | |
| 7,410,586 B2 | 8/2008 | Beste et al. | |
| 7,709,635 B2 | 5/2010 | Davis | |
| 7,722,771 B2 * | 5/2010 | Chordia et al. | 210/634 |
| 7,744,838 B2 | 6/2010 | Davis | |
| 7,750,166 B2 | 7/2010 | Moulton | |
| 7,765,823 B2 | 8/2010 | Shiflett | |
| 2004/0035293 A1 | 2/2004 | Davis | |
| 2004/0133058 A1 | 7/2004 | Arlt et al. | |
| 2005/0196671 A1 | 9/2005 | Paonessa | |
| 2005/0196676 A1 | 9/2005 | Singh | |
| 2006/0197053 A1 | 9/2006 | Shiflett et al. | |
| 2006/0251961 A1 | 11/2006 | Olbert et al. | |
| 2007/0019708 A1 | 1/2007 | Shiflett et al. | |
| 2007/0089449 A1 | 4/2007 | Gurin | |
| 2007/0131535 A1 | 6/2007 | Shiflett et al. | |
| 2007/0142646 A1 | 6/2007 | Maase | |
| 2007/0144186 A1 | 6/2007 | Shiflett et al. | |
| 2007/0295478 A1 | 12/2007 | Shiflett et al. | |
| 2008/0028777 A1 | 2/2008 | Boesmann et al. | |
| 2008/0153697 A1 | 6/2008 | Shiflett et al. | |
| 2008/0293978 A1 | 11/2008 | Shiflett | |
| 2009/0131728 A1 | 5/2009 | Shiflett | |
| 2010/0095703 A1 | 4/2010 | Jork | |
| 2010/0145073 A1 | 6/2010 | Foo | |
| 2010/0145074 A1 | 6/2010 | Foo | |
| 2010/0150804 A1 | 6/2010 | Davis | |
| 2010/0152465 A1 | 6/2010 | Davis | |

FOREIGN PATENT DOCUMENTS

| | | |
|---|---|---|
| DE | 3623680 A1 | 1/1988 |
| DE | 4415199 A1 | 11/1995 |
| KR | 2004-0017506 A | 2/2004 |
| WO | 2005/113702 A1 | 12/2005 |
| WO | WO 2005/113702 * | 12/2005 |
| WO | WO 2005/113702 A1 | 12/2005 |
| WO | 2006077082 A1 | 7/2006 |
| WO | 2006/084262 A | 8/2006 |
| WO | 2006134015 A1 | 12/2006 |
| WO | 2008/057574 A1 | 5/2008 |
| WO | 2009/042847 A1 | 4/2009 |
| WO | 2010/006006 A1 | 1/2010 |

OTHER PUBLICATIONS

U.S. Appl. No. 11/346,028, filed Feb. 2, 2006, Mark Brandon Shiflett.
U.S. Appl. No. 11/435,352, filed May 16, 2006, Mark Brandon Shiflett.
Haaf et al., Refrigeration Technology, Ullmann's Encyclopedia of Industrial Chemistry, Sixth Edition, vol. 31:269-312.
Gordon et al., Ionic Liquid Crystals: Hexafluorophosphate Salts, J. Mater. Chem., 1998, vol. 8:2627-2636.

(Continued)

*Primary Examiner* — Ling Choi
*Assistant Examiner* — Monique Peets

(57) ABSTRACT

This invention relates to a composition comprising water and at least one ionic liquid, and also to devices capable of executing an absorption cycle using such compositions as a refrigerant pair. This invention also provides a method of cooling using an absorption cycle comprising water as the refrigerant and at least one ionic liquid as the absorbent. The present invention also provides a method of heating using an absorption cycle comprising water as the refrigerant and at least one ionic liquid.

13 Claims, 2 Drawing Sheets

(56) References Cited

OTHER PUBLICATIONS

Welton, Room-Temperature Ionic Liquids. Solvents for Synthesis and Catalysis, Chem. Rev., 1999, vol. 99:2071-2084.
Yokozeki, Solubility and Viscosity of Refrigerant-Oil Mixtures, Proc. Intl. Compressor Eng. Conf. at Purdue, 1994, vol. 1:335-340.
Yokozeki, International Journal of Thermophysics, Intl. J. Thermophys., 2001, vol. 22:1057-1071.
Yokozeki, Theoretical Performances of Various Refrigerant-Absorbent Pairs IN a Vapor-Absorption Refrigeration Cycle by the Use of Equations of State, Applied Energy, 2005, vol. 80:383-399.
Tillner-Roth et al., A Helmholtz Free Energy Formulation of the Thermodynamic Properties of the Mixture [Water & Ammonia], J. Phys. Chem. Ref. Data, 1998, vol. 27:63-96.
Shiflett et. al., Solubilities and Diffusivities of Carbon Dioxide in Ionic Liquids: [BMIM][PF6] and [BMIM][BF4], Ind. Eng. Chem. Res., 2005, vol. 44:4453-4464.
Yokozeki, Refrigerants of Ammonia and N-Butane Mixtures, Proc. Int. Congress of Refrigeration, 2004, vol. 3:20-24.
Stoecker et al., Absorption Refrigeration, Refrigeration and Air Conditioning, 1982, pp. 328-350, McGraw-Hill.
PCT International Search Report and Written Opinion for Application No. PCT/US2006/047629, dated June 27, 2007.
Shen Weidao et al., Eng. Thermodynamics, 3rd Edition, pp. 335-337 Translation.
Kim KS et al., Fluid Phase Equilibria, Elsevier, vol. 218, No. 2, 2004, pp. 215-220.
Erickson et. al., Heat-Activated Dual-Function Absorption Cycle, Ashrae Trans., 2004, pp. 515-524.
Eiseman, Why Refrigerant 22 Should Be Favored for Absorption Refrigeration, Ashrae J., 1959, vol. 1:45-50.
Mastrangelo, Solubility of Some Chlorofluorohydrocarbons in Tetraethylene Glyco Dimeethyl Ether, Ashrae J., 1959, vol. 1:64-68.
Nezu et. al., Thermodynamic Properties of Working-Fluid Pairs With R-134A for Absorption Refrigeration System, Natural Working Fluids, 2002, pp. 446-453.
Fatouh et. al., Comparison of R-22 Absorbent Pairs for Absorption Cooling Based on P-T-X Data, Renewable Energy, 1993, vol. 3:31-37.
Bhatt et. al., Thermodynamic Modelling of Absorption-Resorption Heating Cycles With Some New Working Pairs, Heat Recovery System & CHP, 1992, vol. 12:225-233.
Seddon, Ionic Liquids for Clean Technology, Ionic Liquids for Clean Technology, J. Chem. Tech. Biotechnol., 1997, vol. 68:351-356.
Olivier et al., Nonaqeous Room-Temperature Ionic Liquids: A New Class of Solvents for Catalyti Organic Reactions, Chem. Ind., 1996, vol. 68:249-263.
Enderby, Ionic Liquids: Recent Progress and Remiaining Problems, J. Phys. Condensed Matter, 1993, vol. 5:99-106.
Michael Freemantle, Designer Solvents: Ionic Liquids May Boost Clean Technology Development, Chemical and Engineering News, 1998, pp. 32-37.

\* cited by examiner

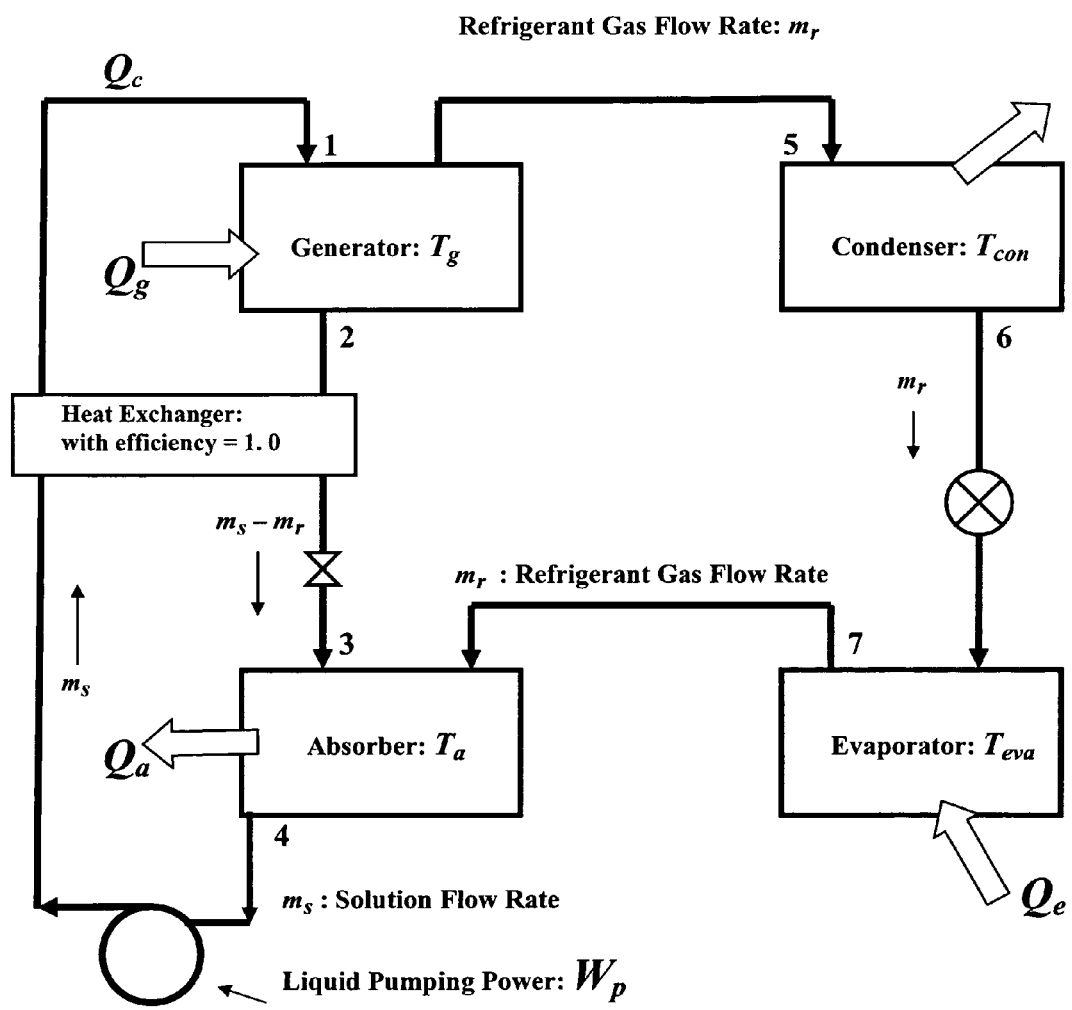
Figure 1 A schematic diagram of a simple absorption refrigeration cycle.

Figure. 2. Solubility diagram of 1-ethyl-3-methylimidazolium tetrafluoroborate in water from 40 to 130°C.
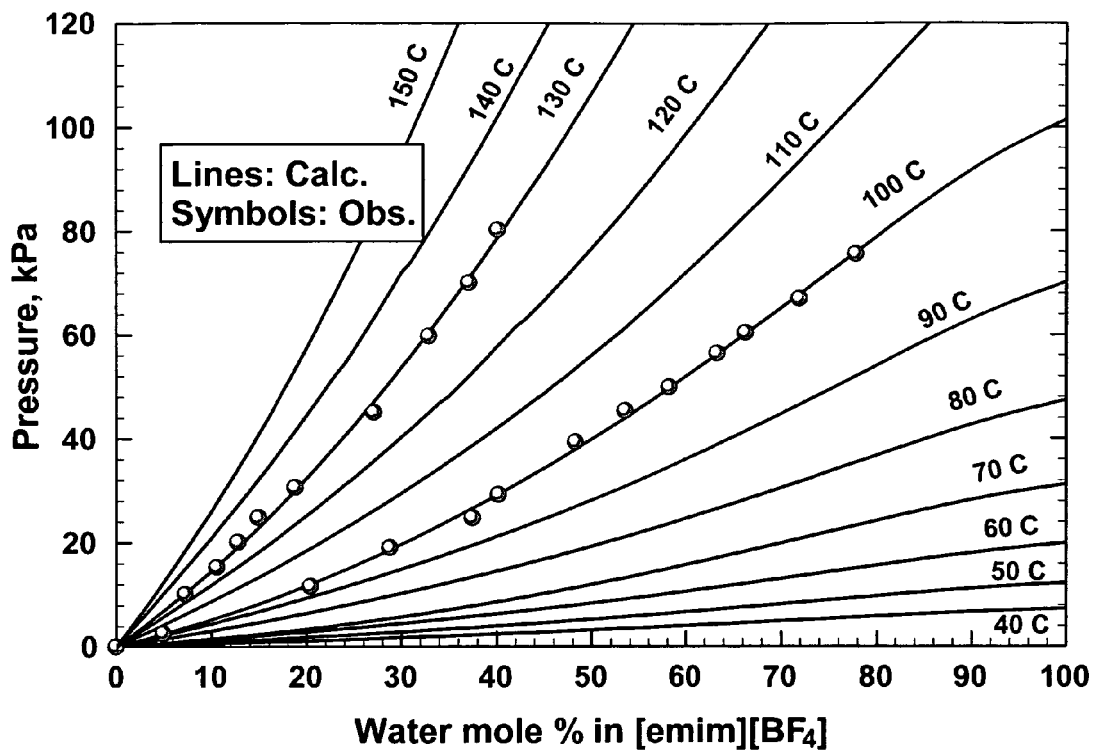

ABSORPTION CYCLE UTILIZING IONIC LIQUIDS AND WATER AS WORKING FLUIDS

This application claims the benefit of U.S. Provisional Application No. 60/750,196, filed Dec. 14, 2005, which is incorporated in its entirety as a part hereof for all purposes.

TECHNICAL FIELD

The present invention relates to an absorption cooling or heating system utilizing a refrigerant pair comprising at least one refrigerant and at least one absorbent, wherein the absorbent in a preferred embodiment may be at least one ionic liquid.

BACKGROUND

As a new type of solvent with immeasurable vapor pressure, room-temperature ionic liquids are being used for chemical separation and unique reaction media. Solvent phase behavior is an important factor in the attractiveness of using ionic liquids in these applications as well as in new applications such as absorption cooling or heating.

The absorption cooling and heating cycle is a more-than-100-year-old technique, and is well known from descriptions such as that by Haaf et al in "Refrigeration Technology" (*Ullmann's Encyclopedia of Industrial Chemistry*, Sixth Edition, Wiley-VCH Verlag GmbH, Weinheim, Germany, Volume 31, pages 269-312). The basic cooling cycle uses a low-temperature liquid refrigerant that absorbs heat from water, air or any medium to be cooled, and converts to a vapor phase (in the evaporator section). The refrigerant vapors are then compressed to a higher pressure by a generator, converted back into a liquid by rejecting heat to the external surroundings (in the condenser section), and then expanded to a low-pressure mixture of liquid and vapor (in the expander section) that goes back to the evaporator section and the cycle is repeated. An absorption system uses heat for compressing refrigerant vapors to a high-pressure.

Although the vapor compression cycle is now used in most air-conditioning and refrigerating applications, the well-known refrigerant-absorber systems ($H_2O$/LiBr and $NH_3$/$H_2O$) are still being used for certain applications, particularly in the field of industrial applications or large-scale water chiller systems. Recently, more attention has been directed toward recovery of waste heat using the $NH_3$/$H_2O$ system (Erickson et al, Heat-Activated Dual-function Absorption Cycle, *ASHRAE Trans.*, 2004, 110). Inherent drawbacks to using LiBr and $NH_3$ as refrigerants include the corrosiveness of LiBr and the toxicity and flammability of $NH_3$.

In the late 1950s, some pioneering works proposed new refrigerant-absorbent pairs for the absorption cycle, using fluoroalkane refrigerants with organic absorbents (Eiseman, A Comparison of Fluoroalkane Absorption Refrigerants, *ASHRAE J.* 1959, 1, 45; Mastrangelo, Solubility of Some Chlorofluorohydrocarbons in Tetraethylene Glycol Ether, *ASHRAE J.* 1959, 1, 64). Such studies continue actively even at the present time, especially among academic institutions [Nezu et al, "Thermodynamic Properties of Working-Fluid Pairs with R-134a for Absorption Refrigeration System", *Natural Working Fluids* 2002, IIR Gustav Lorentzen Conf. 5$^{th}$. China, (Sep. 17-20, 2002, 446-453); Fatouh et al, "Comparison of R-22 Absorption Pairs for Cooling Absorption Based on P-T-X Data", *Renewable Energy*, 1993, 3, 31-37; Bhatt et al, "Thermodynamic Modeling of Absorption-Resorption Heating Cycles with Some New Working Pairs", *Heat Recovery System & CHP*, 1992, 12, 225-233.]

Although U.S. patent application Ser. No. 11/346,028, which is incorporated in its entirety as a part hereof for all purposes, discloses an absorption cycle wherein refrigerant pairs comprising at least one refrigerant and at least one ionic liquid are utilized, a need remains for systems to run an absorption cycle utilizing a selected pairs of refrigerants and ionic liquids.

SUMMARY

This invention provides for the execution or performance of an absorption cycle by operating or running a system or other equipment or apparatus that are suitable to accomplish heating or cooling in view of the heat rejected and absorbed during the repetition of the cycle.

One embodiment of this invention thus provides a composition that includes water and at least one ionic liquid that absorbs water. The ionic liquid may comprise a cation selected from the group consisting of pyridinium, pyridazinium, pyrimidinium, pyrazinium, imidazolium, pyrazolium, thiazolium, oxazolium and triazolium as described herein. These compositions are useful as a refrigerant pair in an absorption heating or cooling cycle, and in a system that operates such a cycle.

Another embodiment of this invention thus provides an apparatus for temperature adjustment that includes (a) an absorber that forms a mixture of a refrigerant and an absorbent; (b) a generator that receives the mixture from the absorber and heats the mixture to separate refrigerant, in vapor form, from the absorbent, and increases the pressure of the refrigerant vapor; (c) a condenser that receives the vapor from the generator and condenses the vapor under pressure to a liquid; (d) a pressure reduction device through which the liquid refrigerant leaving the condenser passes to reduce the pressure of the liquid to form a mixture of liquid and vapor refrigerant; (e) an evaporator that receives the mixture of liquid and vapor refrigerant that passes through the pressure reduction device to evaporate the remaining liquid to form refrigerant vapor; and (f) a conduit that passes the refrigerant vapor leaving the evaporator back to the absorber.

Such an apparatus may be used for heating by locating the condenser in proximity to an object, medium or space to be heated, or the apparatus may be used for cooling by locating the evaporator in proximity to an object, medium or space to be cooled.

In a further embodiment, this invention provides a process for adjusting the temperature of an object, medium or a space by (a) absorbing refrigerant vapor with an absorbent to form a mixture; (b) heating the mixture to separate refrigerant, in vapor form, from the absorbent and increase the pressure of the refrigerant vapor; (c) condensing the refrigerant vapor under pressure to a liquid; (d) reducing the pressure of the liquid refrigerant, and evaporating the refrigerant to form refrigerant vapor; and (e) repeating step (a) to re-absorb, with the absorbent, the refrigerant vapor.

In such a process embodiment, the temperature adjustment performed by the process may be an increase in temperature, and for that purpose refrigerant vapor is condensed to a liquid in proximity to an object, medium or space to be heated; or the temperature adjustment performed by the process may be a decrease in temperature, and for that purpose liquid refrigerant is evaporated in proximity to an object, medium or space to be cooled.

In any of the above embodiments, the refrigerant may be water, and/or the absorbent may be one or more ionic liquids.

BRIEF DESCRIPTION OF THE DRAWINGS

FIG. 1 is a schematic diagram of a simple absorption refrigeration cycle.

FIG. 2 is a solubility diagram of 1-ethyl-3-methylimidazolium tetrafluoroborate in water from 40 to 130° C.

DETAILED DESCRIPTION

In this disclosure, definitions are provided for various terms as set forth in the following list and elsewhere below:

The term "alkane" refers to a saturated hydrocarbon having the general formula $C_nH_{2n+2}$ that may be a straight-chain, branched or cyclic. A cyclic compound requires a minimum of three carbons.

The term "alkene" refers to an unsaturated hydrocarbon that contains one or more C=C double bonds and that may be a straight-chain, branched or cyclic. An alkene requires a minimum of two carbons. A cyclic compound requires a minimum of three carbons.

The term "aromatic" refers to benzene and compounds that resemble benzene in chemical behavior.

An "azeotropic" or "constant boiling" mixture of two or more refrigerants is a mixture wherein the composition of the vapor and liquid phases are substantially the same at a temperature and pressure encountered in a cooling or heating cycle. Included in the definition of a constant boiling mixture is a "near-azeotropic" mixture, which, as described in U.S. Pat. No. 5,709,092, maintains a substantially constant vapor pressure even after evaporative losses, thereby exhibiting constant boiling behavior.

The term "fluorinated ionic liquid" is defined as an ionic liquid having at least one fluorine on either the cation or the anion. A "fluorinated cation" or "fluorinated anion" is a cation or anion, respectively, comprising at least one fluorine.

"Heteroaryl" refers to an alkyl group having a heteroatom.

A "heteroatom" is an atom other than carbon in the structure of an alkanyl, alkenyl, cyclic or aromatic compound.

The term "ionic liquid" is defined as an organic salt that is fluid at or below about 100° C.

A "refrigerant" is a fluidic substance such as water that may be used as a thermal energy transfer vehicle. A refrigerant, when it changes phase from liquid to vapor (evaporates), removes heat from the surroundings; and when it changes phase from vapor to liquid (condenses), it adds heat to the surroundings. Although the term refrigerant may carry the connotation of a substance used only for cooling, the term is used herein in the generic sense of a thermal energy transfer vehicle or substance that is applicable for use in a system or apparatus that may be used for heating or cooling.

The terms "refrigerant pair", "refrigerant/absorbent pair" and "refrigerant/ionic liquid pair" are used interchangeably, and refer to a mixture suitable for use in the operation of an absorption cycle, which requires the presence of both a refrigerant and an absorbent, where the absorbent absorbs the refrigerant. As noted elsewhere, the absorbent herein may be an ionic liquid. A "refrigerant pair composition" is a composition comprising a refrigerant pair, a refrigerant/absorbent pair, or a refrigerant/ionic liquid pair.

The term "vacuum" refers to pressures less than about 1 bar but greater than about $10^{-4}$ bar for practical use in absorption cycles.

The Absorption Cycle

The present invention relates to an absorption cooling and heating system that utilizes refrigerant pairs comprising at least one refrigerant and at least one absorbent. In preferred embodiments of the refrigerant pair composition provided by this invention, the refrigerant may be water, and the absorbent may be one or more ionic liquids. The invention also provides a process for temperature adjustment, either cooling or heating, utilizing refrigerant/absorbent pairs in an absorption cooling or heating system.

An absorption cycle, and systems in which they are run, are described in Application Guide for Absorption Cooling/Refrigeration Using Recovered Heat [Dorgan et al (American Society of Heating, Refrigeration and Air Conditioning Engineers, Inc., 1995, Atlanta Ga., Chapter 5)]. A schematic diagram for a simple absorption cycle, and the apparatus by which it is run, is shown in FIG. 1. The system is composed of condenser and evaporator units with an expansion valve similar to an ordinary vapor compression cycle, but an absorber-generator solution circuit replaces the compressor. The circuit may be composed of an absorber, a generator, a heat exchanger, a pressure control device and a pump for circulating the solution. In some embodiments, the heat released by the absorber upon the absorption of the refrigerant by the absorbent may be used to heat a mixture of refrigerant and absorbent in the generator to separate the refrigerant in vapor form from the absorbent.

As shown in FIG. 1, a typical apparatus for operating an absorption cycle may include components such as an absorber-generator solution circuit as shown on the left side of the drawing, which by the outflow and inflow of heat increases the pressure of refrigerant vapor as a compressor does mechanically, where the circuit may be composed of an absorber, a generator, a heat exchanger, a pressure control device and a pump for circulating the solution. The apparatus also is composed of condenser and evaporator units with an expansion valve, as shown on the right side of the drawing.

In the apparatus as shown in FIG. 1, mixture of a refrigerant and an absorbent is formed in the absorber; the mixture is passed to a generator where the mixture is heated to separate refrigerant, in vapor form, from the absorbent, and the pressure of the refrigerant vapor is increased; the refrigerant vapor is passed to a condenser where the vapor is condensed under pressure to a liquid; the liquid refrigerant is passed to an expansion device where the pressure of the liquid refrigerant is reduced to form a mixture of liquid and vapor refrigerant; the mixture of liquid and vapor refrigerant is passed to an evaporator where the remaining liquid is evaporated to form refrigerant vapor; the refrigerant vapor leaving the evaporator is passed to the absorber to repeat step (a) and re-form a mixture of the refrigerant vapor and the absorbent.

An apparatus as shown in FIG. 1, and the apparatus as disclosed herein is capable of executing an absorption cycle using the refrigerants described herein and/or any one or more absorbents, including for example any of the ionic liquids described herein. The apparatus hereof is also capable of executing any one or more of the processes as described herein. Yet another embodiment of this invention is an apparatus substantially as shown or described in FIG. 1.

The absorber side of the absorption cycle will consist primarily of the ionic liquid. In one embodiment, the concentration of ionic liquid on the absorber side is greater than about 50% by weight of that of the ionic liquid plus the water. In an alternative embodiment, the concentration of ionic liquid on the absorber side is greater than about 70% by weight of that of the ionic liquid plus the water. The generator side of the absorption cycle will consist primarily of water, with the concentration of water being as high as 99 weight percent or greater relative to the weight of the ionic liquid plus the water.

This invention also provides an apparatus for heating an object, medium or space that includes (a) an absorber that forms a mixture of a refrigerant and an absorbent; (b) a generator that receives the mixture from the absorber and heats the mixture to separate refrigerant, in vapor form, from the absorbent, and increases the pressure of the refrigerant vapor; (c) a condenser, located in proximity to the object, medium or space to be heated, that receives the vapor from the generator and condenses the vapor under pressure to a liquid; (d) a pressure reduction device through which the liquid refrigerant leaving the condenser passes to reduce the pressure of the liquid to form a mixture of liquid and vapor refrigerant; (e) an evaporator that receives the mixture of liquid and vapor refrigerant that passes through the pressure reduction device to evaporate the remaining liquid to form refrigerant vapor; and (f) a conduit that passes the refrigerant vapor leaving the evaporator to the absorber.

This invention also provides an apparatus for cooling an object, medium or space that includes (a) an absorber that forms a mixture of a refrigerant and an absorbent; (b) a generator that receives the mixture from the absorber and heats the mixture to separate refrigerant, in vapor form, from the absorbent, and increases the pressure of the refrigerant vapor; (c) a condenser that receives the vapor from the generator and condenses the vapor under pressure to a liquid; (d) a pressure reduction device through which the liquid refrigerant leaving the condenser passes to reduce the pressure of the liquid to form a mixture of liquid and vapor refrigerant; (e) an evaporator, located in proximity to the object, medium or space to be cooled, that receives the mixture of liquid and vapor refrigerant that passes through the pressure reduction device to evaporate the remaining liquid to form refrigerant vapor; and (f) a conduit that passes the refrigerant vapor leaving the evaporator to the absorber.

An apparatus of this invention may be deployed for use in, or fabricated or operated as, a refrigerator, a freezer, an ice machine, an air conditioner, an industrial cooling system, a heater or heat pump. Each of these instruments may be situated in a residential, commercial or industrial setting, or may be incorporated into a mobilized device such as a car, truck, bus, train, airplane, or other device for transportation, or may be incorporated into a piece of equipment such as a medical instrument.

This invention also provides a process for heating an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) condensing the refrigerant vapor under pressure to a liquid in proximity to the object, medium or space to be heated; (d) reducing the pressure of the liquid refrigerant, and evaporating the refrigerant to form refrigerant vapor; and (e) repeating step (a) to re-absorb, with the absorbent, the refrigerant vapor.

This invention also provides a process for cooling an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) condensing the refrigerant vapor under pressure to a liquid; (d) reducing the pressure of the liquid refrigerant, and evaporating the refrigerant, in proximity to the object, medium or space to be cooled, to form refrigerant vapor; and (e) repeating step (a) to re-absorb, with the absorbent, the refrigerant vapor.

This invention also provides a process for heating an object, medium or a space in an apparatus that executes an absorption cycle by (a) forming in an absorber a mixture of a refrigerant and an absorbent; (b) passing the mixture to a generator where the mixture is heated to separate refrigerant, in vapor form, from the absorbent, and the pressure of the refrigerant vapor is increased; (c) passing the refrigerant vapor to a condenser in proximity to the object, medium or space to be heated where the vapor is condensed under pressure to a liquid; (d) passing the liquid refrigerant to an expansion device where the pressure of the liquid refrigerant is reduced to form a mixture of liquid and vapor refrigerant; (e) passing the mixture of liquid and vapor refrigerant to an evaporator where the remaining liquid is evaporated to form refrigerant vapor; and (f) passing the refrigerant vapor leaving the evaporator to the absorber to repeat step (a) and re-form a mixture of the refrigerant vapor and the absorbent.

This invention also provides a process for cooling an object, medium or a space in an apparatus that executes an absorption cycle by (a) forming in an absorber a mixture of a refrigerant and an absorbent; (b) passing the mixture to a generator where the mixture is heated to separate refrigerant, in vapor form, from the absorbent, and the pressure of the refrigerant vapor is increased; (c) passing the refrigerant vapor to a condenser where the vapor is condensed under pressure to a liquid; (d) passing the liquid refrigerant to an expansion device where the pressure of the liquid refrigerant is reduced to form a mixture of liquid and vapor refrigerant; (e) passing the mixture of liquid and vapor refrigerant to an evaporator in proximity to the object, medium or space to be cooled where the remaining liquid is evaporated to form refrigerant vapor; and (f) passing the refrigerant vapor leaving the evaporator to the absorber to repeat step (a) and re-form a mixture of the refrigerant vapor and the absorbent.

In any process as described above, the absorbent separated from refrigerant in step (b) may be recirculated for use in a later step.

Refrigerant/Absorbent Pairs:

Refrigerants:

The present invention provides refrigerant pair compositions for use in an absorption cycle, which can be used for cooling, or for generating heat, depending on the application. Water is used as a refrigerant in this invention, but a mixture of water with other refrigerants selected from the group consisting of a hydrofluorocarbon, a hydrochlorofluorocarbon, a chlorofluorocarbon, a fluorocarbon, nitrogen ($N_2$), oxygen ($O_2$), carbon dioxide ($CO_2$), ammonia ($NH_3$), argon (Ar), hydrogen ($H_2$), and non-fluorinated hydrocarbon, wherein the non-fluorinated hydrocarbon is selected from the group consisting of $C_1$ to $C_4$ straight-chain, branched or cyclic alkanes and $C_1$ to $C_4$ straight-chain, branched or cyclic alkenes, is within the scope of this invention as well. The second member of the refrigerant pair comprises at least one ionic liquid.

Hydrofluorocarbon refrigerants may include compounds having any combination of hydrogen and fluorine with carbon and include compounds with carbon-carbon double bonds with normal boiling points below 0° C. Examples of hydrofluorocarbon refrigerants useful for the invention include difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) and fluoroethane (HFC-161). In one embodiment of the invention, the hydrofluorocarbon refrigerants are selected from the group consisting of difluoromethane (HFC-32), pentafluoroethane (HFC-125), 1,1,1,2-tetrafluoroethane (HFC-134a), 1,1,1-trifluoroethane (HFC-143a) and 1,1-difluoroethane (HFC-152a).

Chlorofluorocarbon refrigerants may include compounds having any combination of chlorine and fluorine with carbon and include compounds with carbon-carbon double bonds with normal boiling points below 0° C. An example of a chlorofluorocarbon refrigerant useful for the invention is dichlorodifluoromethane (CFC-12).

Hydrochlorofluorocarbon refrigerants may include compounds with any combination of hydrogen, chlorine and fluorine with carbon and include compounds with carbon-carbon double bonds with normal boiling points below 0° C. An example of a hydrochlorofluorocarbon refrigerant useful for the invention includes chlorodifluoromethane (HCFC-22).

Fluorocarbon refrigerants may include compounds with any combination of fluorine and carbon and include compounds with carbon-carbon double bonds with normal boiling points below 0° C. Examples of fluorocarbon refrigerants useful for the invention include perfluoromethane (FC-14) and perfluoroethane (FC-116).

Non-fluorinated hydrocarbon refrigerants useful for the invention may include methane, ethane, ethylene, propane, cyclopropane, propylene, butane, butene and isobutane.

A refrigerant as used herein may also be selected from the group consisting water, and mixtures of water with HFC-32, HFC-125, HFC-134, HFC-134a, HFC-143a, HFC-152a, HFC-161, HCFC-22, FC-14, FC-116, CFC-12, $NH_3$, $CO_2$, $N_2$, $O_2$, $H_2$, Ar, methane, ethane, propane, cyclopropane, propylene, butane, butene, and isobutane.

Mixtures of refrigerants are also useful for achieving proper boiling temperature or pressure appropriate for absorption equipment. In particular, mixtures that form azeotropes or constant boiling mixtures are sometimes preferred because minimal to no fractionation of the mixture will occur if the refrigerant leaks from the absorption cooling system.

Absorbents:

In a preferred embodiment of the absorption cycle of this invention, the absorbent used is an ionic liquid, which can in principle be any ionic liquid that absorbs water. An ionic liquid that absorbs water is an ionic liquid with which at least to some extent water is miscible, or in which at least to some extent water is soluble. The energy efficiency of the absorption cycle will increase in direct proportion to the extent to which the ionic liquid has high absorption for water (i.e. water has high miscibility therewith or water is soluble therein to a large extent).

Ionic liquids are organic compounds that are liquid at room temperature (approximately 25° C.). They differ from most salts in that they have very low melting points, and they tend to be liquid over a wide temperature range. Ionic liquids have essentially no vapor pressure, and they can either be neutral, acidic or basic. The properties of an ionic liquid can be tailored by varying the cation and anion. A cation or anion of an ionic liquid of the invention can in principle be any cation or anion such that the cation and anion together form an organic salt that is liquid at or below about 100° C.

Many ionic liquids are formed by reacting a nitrogen-containing heterocyclic ring, preferably a heteroaromatic ring, with an alkylating agent (for example, an alkyl halide) to form a quaternary ammonium salt, and performing ion exchange or other suitable reactions with various Lewis acids or their conjugate bases to form the ionic liquid. Examples of suitable heteroaromatic rings include substituted pyridines, imidazole, substituted imidazole, pyrrole and substituted pyrroles. These rings can be alkylated with virtually any straight, branched or cyclic $C_{1-20}$ alkyl group, but preferably, the alkyl groups are $C_{1-16}$ groups, since groups larger than this may produce low melting solids rather than ionic liquids. Various triarylphosphines, thioethers and cyclic and non-cyclic quaternary ammonium salts may also been used for this purpose. Counterions that may be used include chloroaluminate, bromoaluminate, gallium chloride, tetrafluoroborate, tetrachloroborate, hexafluorophosphate, nitrate, trifluoromethane sulfonate, methylsulfonate, p-toluenesulfonate, hexafluoroantimonate, hexafluoroarsenate, tetrachloroaluminate, tetrabromoaluminate, perchlorate, hydroxide anion, copper dichloride anion, iron trichloride anion, zinc trichloride anion, as well as various lanthanum, potassium, lithium, nickel, cobalt, manganese, and other metal-containing anions.

Ionic liquids may also be synthesized by salt metathesis, by an acid-base neutralization reaction or by quaternizing a selected nitrogen-containing compound; or they may be obtained commercially from several companies such as Merck (Darmstadt, Germany) or BASF (Mount Olive, N.J.).

Representative examples of ionic liquids useful herein included among those that are described in sources such as *J. Chem. Tech. Biotechnol.*, 68:351-356 (1997); *Chem. Ind.*, 68:249-263 (1996); *J. Phys. Condensed Matter*, 5: (supp 34B):B99-B106 (1993); *Chemical and Engineering News*, Mar. 30, 1998, 32-37; *J. Mater. Chem.*, 8:2627-2636 (1998); *Chem. Rev.*, 99:2071-2084 (1999); and WO 05/113,702 (and references therein cited). In one embodiment, a library, i.e. a combinatorial library, of ionic liquids may be prepared, for example, by preparing various alkyl derivatives of a quaternary ammonium cation, and varying the associated anions. The acidity of the ionic liquids can be adjusted by varying the molar equivalents and type and combinations of Lewis acids.

In one embodiment, ionic liquids suitable for use herein include those having cations selected from the following Formulae:

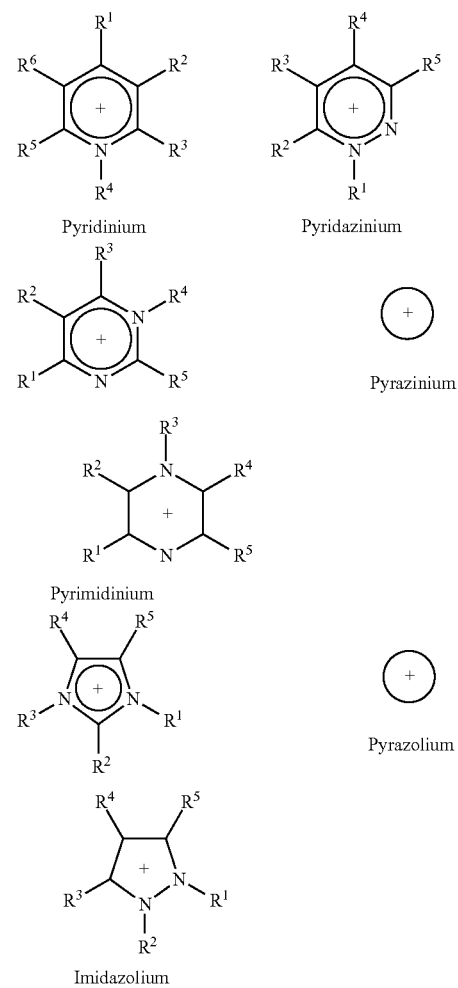

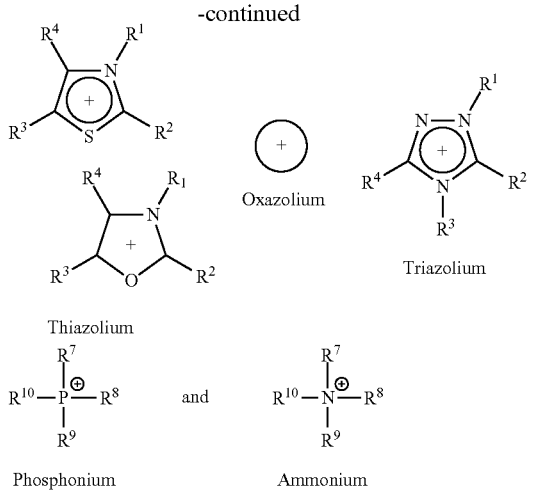

Thiazolium

Oxazolium

Triazolium

Phosphonium

Ammonium wherein $R^1$, $R^2$, $R^3$, $R^4$, $R^5$ and $R^6$ are independently selected from the group consisting of:
- (i) H
- (ii) halogen
- (iii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
- (iv) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;
- (v) $C_6$ to $C_{20}$ unsubstituted aryl, or $C_3$ to $C_{25}$ unsubstituted heteroaryl having one to three heteroatoms independently selected from the group consisting of O, N, Si and S; and
- (vi) $C_6$ to $C_{25}$ substituted aryl, or $C_3$ to $C_{25}$ substituted heteroaryl having one to three heteroatoms independently selected from the group consisting of O, N, Si and S; and wherein said substituted aryl or substituted heteroaryl has one to three substituents independently selected from the group consisting of:
  - (1) —$CH_3$, —$C_2H_5$, or $C_3$ to $C_{25}$ straight-chain, branched or cyclic alkane or alkene, optionally substituted with at least one member selected from the group consisting of Cl, Br, F I, OH, $NH_2$ and SH,
  - (2) OH,
  - (3) $NH_2$, and
  - (4) SH;

$R^7$, $R^8$, $R^9$, and $R^{10}$ are independently selected from the group consisting of:
- (vii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
- (viii) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;
- (ix) $C_6$ to $C_{25}$ unsubstituted aryl, or $C_3$ to $C_{25}$ unsubstituted heteroaryl having one to three heteroatoms independently selected from the group consisting of O, N, Si and S; and
- (x) $C_6$ to $C_{25}$ substituted aryl, or $C_3$ to $C_{25}$ substituted heteroaryl having one to three heteroatoms independently selected from the group consisting of O, N, Si and S; and wherein said substituted aryl or substituted heteroaryl has one to three substituents independently selected from the group consisting of:
  - (1) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH,
  - (2) OH,
  - (3) $NH_2$, and
  - (4) SH; and wherein optionally at least two of $R^1$, $R^2$, $R^3$, $R^4$, $R^5$, $R^6$, $R^7$, $R^8$, $R^9$, and $R^{10}$ can together form a cyclic or bicyclic alkanyl or alkenyl group.

In another embodiment, ionic liquids useful for the invention comprise fluorinated cations wherein at least one member selected from $R^1$, $R^2$, $R^3$, $R^4$, $R^5$, $R^6$, $R^7$, $R^8$, $R^9$ and $R^{10}$ comprises $F^-$.

In one embodiment, ionic liquids useful herein may have anions selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$; and preferably any fluorinated anion. Fluorinated anions useful herein include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$; and $F^-$.

In another embodiment, an ionic liquid suitable for use herein may have an anion of the Formula:

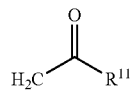

wherein $R^{11}$ is selected from the group consisting of:
- (i) —$CH_3$, —$C_2H_5$, or $C_3$ to $C_{10}$ straight-chain, branched or cyclic alkane or alkene, optionally substituted with at least one member selected from the group consisting of Cl, Br, F, I, OH, $NH_2$ and SH;
- (ii) —$CH_3$, —$C_2H_5$, or $C_3$ to $C_{10}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;
- (iii) $C_6$ to $C_{10}$ unsubstituted aryl, or $C_3$ to $C_{10}$ unsubstituted heteroaryl having one to three heteroatoms independently selected from the group consisting of O, N, Si and S; and
- (iv) $C_6$ to $C_{10}$ substituted aryl, or $C_3$ to $C_{10}$ substituted heteroaryl having one to three heteroatoms independently selected from the group consisting of O, N, Si and S; and wherein said substituted aryl or substituted heteroaryl has one to three substituents independently selected from the group consisting of:
  - (1) —$CH_3$, —$C_2H_5$, or $C_3$ to $C_{10}$ straight-chain, branched or cyclic alkane or alkene, optionally substituted with at least one member selected from the group consisting of Cl, Br, F I, OH, $NH_2$ and SH,
(2) OH,
(3) $NH_2$, and
(4) SH.

In another embodiment, ionic liquids suitable for use herein may have a cation selected from the group consisting of pyridinium, pyridazinium, pyrimidinium, pyrazinium, imidazolium, pyrazolium, thiazolium, oxazolium, triazolium, phosphonium, and ammonium as defined above; and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, and any fluorinated anion. In yet another embodiment, ionic liquids suitable for use herein may have a cation selected from the group consisting of pyridinium, pyridazinium, pyrimidinium, pyrazinium, imidazolium, pyrazolium, thiazolium, oxazolium, triazolium, phosphonium, and ammonium as defined above; and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$, and $F^-$.

In still another embodiment, ionic liquids suitable for use herein may have a cation selected from the group consisting of pyridinium, pyridazinium, pyrimidinium, pyrazinium, imidazolium, pyrazolium, thiazolium, oxazolium, triazolium, phosphonium, and ammonium as defined above, wherein at least one member selected from $R^1, R^2, R^3, R^4, R^5, R^6, R^7, R^8, R^9$, and $R^{10}$ comprises $F^-$; and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, and any fluorinated anion. In still another embodiment, ionic liquids suitable for use herein may have a cation selected from the group consisting of pyridinium, pyridazinium, pyrimidinium, pyrazinium, imidazolium, pyrazolium, thiazolium, oxazolium, triazolium, phosphonium, and ammonium as defined above, wherein at least one member selected from $R^1, R^2, R^3, R^4, R^5, R^6, R^7, R^8, R^9$, and $R^{10}$ comprises $F^-$; and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$, and $F^-$.

In still another embodiment, ionic liquids suitable for use in this invention may have:

a) imidazolium as the cation, and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$, $[CH_3OSO_3]^-$;

b) 1-butyl-3-methylimidazolium as the cation, and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$;

c) 1-propyl-2,3-dimethylimidazolium as the cation, and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, and $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$;

d) 1-ethyl-3-methylimidazolium as the cation, and $[(CF_3CF_2SO_2)_2N]^-$, $[PF_6]^-$, and $[HCF_2CF_2SO_3]^-$ as the anion;

e) 1-propyl-3-methylpyridinium as the cation, and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, and $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$;

f) 1,2-dimethyl-3-propylimidazolium as the cation, and an anion selected from the group consisting of $[(CF_3SO_2)_3C]^-$ and $[(CF_3SO_2)_2N]^-$;

g) 3-methyl-1-propylpyridinium as the cation, and $[(CF_3SO_2)_2N]^-$ as the anion;

h) 1-butyl-3-methylpyridinium as the cation, and $[(CF_3SO_2)_2N]^-$ as the anion;

i) 1-dodecyl-3-methylimidazolium as the cation, and $[HCF_2CF_2SO_3]^-$ as the anion;

j) 1-heptyl-3-methylimidazolium as the cation, and $[HCF_2CF_2SO_3]^-$ as the anion;

k) tetradecyl(trihexyl)phosphonium as the cation, and $[CF_3CF_2OCFHCF_2SO_3]^-$ or $[CF_3OCFHCF_2SO_3]^-$ as the anion;

l) tributyl(tetradecyl)phosphonium as the cation, and $[CF_3HFCCF_2SO_3]^-$ as the anion;

m) 1,3-dioctylimidazolium or 1-octyl-3-methylimidazolium as the cation, and $[I]^-$ as the anion.

In yet another embodiment of this invention, in an ionic liquid suitable for use herein, the cation is 1-ethyl-3-methylimidazolium, and the anion is tetrafluoroborate.

In general, water would be expected to be more miscible with or soluble in ionic liquids that are hydrophilic to some extent, and ionic liquids having cations having at least one alcohol side chain, or those comprising anions having at least one acetate or sulfate group, would thus be desirable choices for use in various embodiments of this invention. Water will also preferably be miscible with or soluble in an ionic liquid as used herein over the temperature range of the operation of the absorption system, particularly from that of the evaporator to that of the generator. Evaporator temperatures can be as low as about 5° C. Single effect generator temperatures can be as high as about 150° C., while double effect generator temperatures can be as high as about 200° C. As a consequence, over a temperature range of from about 5° C. to about 200° C., a variety of different levels of the relative content of the refrigerant and absorbent in an absorption cycle are suitable, and the concentration of either water or an ionic liquid in a composition formed therefrom may be in the range of from about 1% to about 99% by weight of the combined weight of the ionic liquid and water therein.

In various embodiments of this invention, an ionic liquid formed by selecting any of the individual cations described or disclosed herein, and by selecting any of the individual anions described or disclosed herein with which to pair the cation, may be used as an absorbent in an absorption heating or cooling cycle. Correspondingly, in yet other embodiments, a subgroup of ionic liquids formed by selecting (i) a subgroup of any size of cations, taken from the total group of cations described and disclosed herein in all the various different combinations of the individual members of that total group, and (ii) a subgroup of any size of anions, taken from the total group of anions described and disclosed herein in all the various different combinations of the individual members of that total group, may be used as an absorbent. In forming an ionic liquid, or a subgroup of ionic liquids, by making selections as aforesaid, the ionic liquid or subgroup will be used in the absence of the members of the group of cations and/or anions that are omitted from the total group thereof to make the selection, and, if desirable, the selection may thus be made in terms of the members of the total group that are omitted from use rather than the members of the group that are included for use.

Mixtures of ionic liquids may also be used herein as the absorbent, and such mixtures may be desirable, for example, for achieving proper absorption behavior, in particular if water is mixed with other components such as alcohols, esters or ethers which maybe used in combination with absorption equipment.

Additives, such as lubricants, corrosion inhibitors, stabilizers, dyes, and other appropriate materials may be added to the refrigerant pair compositions useful for the invention for a variety of purposes provided they do not have an undesirable influence on the extent to which water is soluble in an ionic liquid absorbent. The refrigerant pair compositions of the invention may be prepared by any convenient method, including mixing or combining the desired amounts of each component in an appropriate container using, for example, known types of stirrers having rotating mixing elements.

A convenient way to evaluate the performance in an absorption cycle of a refrigerant and/or an absorbent is to employ thermodynamic property charts such as temperature-pressure-concentration (TPX) and enthalpy-temperature (HT) diagrams. These charts correspond to the familiar PH (pressure-enthalpy) or TS (temperature-entropy) diagram in the vapor compression cycle analysis. However, the use of these charts is adapted to the particular case of an absorption cycle since vapor compression uses a compressor, where the compression process is theoretically a single isentropic path, while the absorption cycle employs the so-called generator-absorber solution circuit, and several thermodynamic processes are involved.

The PH or TS diagram in the vapor compression cycle is constructed using equations of state (EOS), and the cycle performance and all thermodynamic properties can be calculated. The thermodynamic charts for the absorption cycle are usually made by empirical correlation equations, which are fitted to experimental solubility and heat capacity data for solution properties, while the vapor phase properties are calculated with the refrigerant EOS. The solubility data may in certain instances be correlated using theoretical solution (often called "activity") models (Nezu, Y., supra; Fatouh, M. and Murthy, S. S. [Renewable Energy, 1993, 3:31-37]; Bhatt, M. S., et al [Heat Recovery System & CHP, 1992, 12:225-233]; Ness, H. C. V. and Abbott, M. M. [Classical Thermodynamics of Nonelectrolyte Solutions with Applications to Phase Equilibria, 1982, McGraw-Hill, New York]). However, such models are limited in their use to temperatures well below the refrigerant critical temperature, and modeling solutions at high generator temperatures may become invalid. The combined use of empirical fitting equations or partially correct equations with the gas phase EOS may thus not always be completely consistent, and it is desirable to model the absorption cycle process with thermodynamically sound EOS. By the use of EOS, even above the critical temperature of refrigerants, thermodynamic properties can be correctly calculated.

Although modeling refrigerant mixtures with EOS is familiar, refrigerant and non-volatile compound mixtures are traditionally treated with empirical correlation models by air conditioning and refrigeration engineers: e.g., refrigerant-lubricant oil solubility. Although one of the difficult problems in using EOS for such mixtures is determining how to set up EOS parameters for non-volatile compounds without much information about the critical parameters and vapor pressure data, EOS models have been successfully applied to refrigerant-lubricant oil solubility data as more fully described in Yokozeki, A. [Proc. Intl. Compressor Eng. Conf. at Purdue, 1994, 1:335-340]; Yokozeki, A. [Intl. J. Thermophys., 2001, 22:1057-1071]; and Yokozeki, A. [Applied Energy, 2005, 80:383-399]. Similar EOS models can therefore be used herein to calculate all thermodynamic properties consistently for use as an indicator of the utility of the refrigerants and ionic liquids disclosed herein as new absorption cycle fluid pairs (Tillner-Roth R and Friend D G [J. Phys. Chem. Ref. Data, 1998, 27, 63-96]).

To model a refrigerant/ionic liquid composition, a generic Redlich-Kwong (RK) type of cubic equation of state (EOS) may be employed as follows:

$$P = \frac{RT}{\tilde{V} - b} - \frac{a(T)}{\tilde{V}(\tilde{V} + b)} \tag{1}$$

$$a(T) = 0.427480 \frac{R^2 T_c^2}{P_c} \alpha(T) \tag{2}$$

$$b = 0.08664 \frac{RT_c}{P_c} \tag{3}$$

The temperature-dependent part of the a parameter in the EOS for pure compounds is modeled by the following empirical form (Yokozeki, A. [Intl. J. Thermophys., 2001, 22:1057-1071]; Yokozeki, A. [Applied Energy, 2005, 80:383-399]; Shiflett, M. B. and Yokozeki, A. [Ind. Eng. Chem. Res. 2005, 44:4453-4464]):

$$\alpha(T) = \sum_{k=0}^{\leq 3} \beta_k \left(\frac{T_c}{T} - \frac{T}{T_c}\right)^k. \tag{4}$$

The coefficients, $\beta_k$, are determined so as to reproduce the vapor pressure of each pure compound.

For absorbents, however, vapor pressure data are usually not available, or vapor pressures are practically zero at application temperatures, and furthermore, no data for the critical parameters ($T_c$ and $P_c$) exist. The critical parameters of absorbents can, nevertheless, be estimated in various ways (Reid R C, et al., The Properties of Gases & Liquids, $4^{th}$ edn. [McGraw-Hill, New York 1987]). As discussed by Yokozeki (Int. J. Thermophys., 2001, 22, 1057-1071), estimates of critical parameters for high boiling-point compounds are sufficient for correlating solubility (PTx) data. The temperature-dependent part of the a parameter for absorbents is significant however when the PTx data of refrigerant-absorbent mixtures are correlated, although the vapor pressure of absorbents is essentially zero at the temperature of interest. Here, $\alpha(T)$ for an absorbent is modeled by only two terms in eq 4, as applied for the case of refrigerant-lubricant oil mixtures (Yokozeki A, 2001, supra).

$$k_{ij} = \frac{l_{ij}l_{ji}(x_i + x_j)}{l_{ji}x_i + l_{ij}x_j} \quad \text{where } k_{ii} = 0 \quad (5)$$

$$\alpha(T) = 1 + \beta_1\left(\frac{T_c}{T} - \frac{T}{T_c}\right) \quad (6)$$

The coefficient $\beta_1$ in eq 6 will be treated as an adjustable fitting parameter.

Then, the a and b parameters for general N-component mixtures are modeled in terms of binary interaction parameters (Yokozeki A [Applied Energy, 2005, 80, 383-399]; and Shiflett M B and Yokozeki A, supra), which may be regarded as a modified van der Waals-Berthelot mixing formula.

$$a(T) = \sum_{i,j=1}^{N} \sqrt{a_i a_j}\,(1 - f(T)k_{ij})x_i x_j, \quad a_i = 0.427480\frac{R^2 T_{ci}^2}{P_{ci}}\alpha_i(T) \quad (7)$$

$$f(T) = 1 + \tau_{ij}/T, \quad \text{where } \tau_{ij} = \tau_{ji}, \text{ and } \tau_{ii} = 0 \quad (8)$$

$$b = \frac{1}{2}\sum_{i,j=1}^{N}(b_i + b_j)(1 - m_{ij})x_i x_j, \quad (9)$$

$$b_i = 0.08664\frac{RT_{ci}}{P_{ci}},$$

where $m_{ij} = m_{ji}, m_{ii} = 0$ $T_{ci}$: critical temperature of i-th species.
$P_{ci}$: critical pressure of i-th species.
$x_i$: mole fraction of i-th species.

In the present model, there are four binary interaction parameters: $l_{ij}, l_{ji}, m_{ij},$ and $\tau_{ij}$ for each binary pair. It should be noted that when $l_{ij}=l_{ji}$ in eq 5 and $\tau_{ij}=0$ in eq 8, eq 7 becomes the ordinary quadratic-mixing rule for the a parameter. The present EOS model has been successfully applied for mixtures that are highly non-symmetric with respect to polarity and size, such as various refrigerant/oil mixtures (Yokozeki A, 2001, supra]) and ammonia/butane mixtures (Yokozeki A [Proc. Int. Congress of Refrigeration Washington, D.C. 2003]); and EcoLibrium™ (2004, 3, 20-24).

For phase equilibrium (solubility) calculations, the fugacity coefficient $\phi_i$ for each compound is needed and derived for the present mixing rule:

$$\ln\phi_i = -\ln\frac{PV}{RT}\left(1 - \frac{b}{V}\right) + \frac{b'_i}{V - b} - \frac{ab'_i}{bRT(V + b)} + \frac{a}{bRT}\left(\frac{a'_i}{a} - \frac{b'_i}{b} + 1\right)\ln\frac{V}{V + b}, \quad (10)$$

where $b'_i$ and $a'_i$ are given by:

$$b'_i = \sum_{j=1}^{N}(b_i + b_j)(1 - m_{ij})x_j - b \quad (11)$$

$$a'_i = 2\sum_{j=1}^{N}\sqrt{a_i a_j}\,x_j\left\{1 - k_{ij} - \frac{x_i x_j(l_{ji} - l_{ij})(1 + \tau_{ij}/T)}{(l_{ji}x_i + l_{ij}x_j)^2}\right\} - a. \quad (12)$$

A thermodynamically derived function relevant to the present study is an enthalpy (H), which is given, in a general form, by:

$$H = \int \sum_{i=1}^{N} C_{pi}^0 x_i dT + \left(\frac{a}{b} - \frac{T}{b}\frac{da}{dT}\right)\ln\frac{V}{V + b} + RT\left(\frac{PV}{RT} - 1\right) - \frac{RT^2}{V - b}\frac{db}{dT} + \frac{a}{b}\frac{db}{dT}\left[\frac{1}{V + b} - \frac{1}{b}\ln\left(1 + \frac{b}{V}\right)\right] + C, \quad (13)$$

where C is an arbitrary constant, which can be any value of choice but must be the same constant for any component mixtures within the system in question. The ideal-gas heat capacity for each compound $C_{pi}^0$ in eq 13 is modeled with a polynomial form:

$$C_p^0 = C_0 + C_1 T + C_2 T^2 + C_3 T^3. \quad (14)$$

Theoretical cycle performances for the absorption heating or cooling cycle as shown in FIG. 1 are modeled as follows. The overall energy balance gives:

$$Q_g + Q_e + W_p = Q_c + Q_a \quad (15)$$

From the material balance in the absorber or generator:

$$m_s x_a = (m_s - m_r)x_g; \quad (16)$$

this provides a mass-flow-rate ratio, f, as defined by:

$$f \equiv \frac{m_s}{m_r} = \frac{x_g}{x_g - x_a}, \quad (17)$$

where x is a mass fraction of an absorbent in solution, the subscripts a and g stand for the absorber and generator solutions, and $m_r$ and $m_s$ are mass flow rates of gaseous refrigerant and absorber-exit solution (or solution pumping rate), respectively.

When a heat transfer efficiency of unity in the heat exchanger unit is assumed, the energy balance equation becomes:

$$Q_h \equiv (H_2 - H_3)(m_s - m_r) = (H_1 - H_4)m_s - W_p, \quad (18)$$

where H is an enthalpy, and the subscript numbers (1, 2, 3, and 4) correspond to the locations shown in FIG. 1. From eq 18, the generator-inlet enthalpy, $H_1$, can be obtained:

$$H_1 = H_4 + (H_2 - H_3)(1 - 1/f) + W_p/m_r. \quad (19)$$

From the energy balance around the generator, the generator heat input, $Q_g$, is given by, $$Q_g = H_5 m_r + H_2(m_s - m_r) - H_1 m_s. \quad (20)$$

By eliminating $H_1$ from this equation with eq 19, eq 20 can be written as:

$$Q_g/m_r = H_5 - H_4 f + H_3(f-1) - W_p/m_r. \quad (21)$$

Similarly, the heat rejection in the absorber, $Q_a$, is given by, $$Q_a/m_r = H_3(f-1) + H_7 - H_4 f. \quad (22)$$

Condenser and evaporator heats per unit mass flow, respectively, are:

$$Q_c/m_r = H_5 - H_6 \qquad (23)$$

$$Q_e/m_r = H_7 - H_6. \qquad (24)$$

Then, the system performance is defined by a heat ratio, η, (output power divided by input power):

$$\eta = \frac{Q_e}{Q_g + W_P}.$$

However, the solution pumping power, $W_p$, is usually much smaller than $Q_g$, and it is customary to use a COP (coefficient of performance) defined as:

$$COP = \frac{Q_e}{Q_g}. \qquad (25)$$

This can be expressed in terms of H and f:

$$COP = \frac{H_7 - H_6}{H_5 + H_3(f-1) - H_4 f}. \qquad (26)$$

Enthalpies at all locations and solubility in the absorber and generator units are calculated in a thermodynamically consistent way by use of the EOS model discussed above.

The pure component EOS constants for refrigerants have been taken from Yokozeki A (2001, supra), Yokozeki A (Proc. Int. Congress of Refrigeration, Washington, D.C. 2003), and EcoLibrium™ (2004, 3, 20-24), and are listed in Example 1, Table 1. As for selected absorbents in this study, the critical parameters have been estimated from group contribution methods (Reid R C et al, supra), and are also shown in Example 1, Table 1. The accuracy in critical parameters for these high boiling-point materials is less important for correlating solubility data (Yokozeki A, 2001, supra). However, as mentioned earlier, the $\beta_1$ parameter in eq 6 can be important, and will be treated as an adjustable parameter in the analysis of binary solubility data.

In order to calculate thermal properties with EOS, the ideal gas heat capacity for each pure compound is needed as a function of temperature: see eq 14. The coefficients for eq 14 are listed in Example 1, Table 2, where those for absorbents have all been estimated from group contribution methods (Reid R C et al, supra).

Next, the solubility (VLE: vapor-liquid equilibrium) data of fluorocarbon/ionic liquid binary mixtures is analyzed in order to determine the EOS parameters for mixtures. The four binary interaction parameters, $l_{ij}$, $l_{ji}$, $m_{ij}$, and $\tau_{ij}$, and the absorbent $\beta_1$, parameter for each binary pair have been determined by non-linear least squares analyses with an object function of relative pressure differences. The results for selected binary mixtures are shown in Example 1, Table 3.

Evaluation of the theoretical performance of an absorption heating or cooling cycle is based on a simple ideal cycle shown in FIG. 1, and the present theoretical model. Here, the pumping power $W_p$ is neglected, since it is usually insignificant with respect to other thermal powers. In addition, several assumptions are made:
(1) There is no pressure drop in connecting lines.
(2) The refrigerant expansion process from the condenser to the evaporator is iso-enthalpic, as is usually done in vapor compression cycle calculations. The condition at Point 7 in FIG. 1 (exit of evaporator) is a pure refrigerant dew point with $T = T_{eva}$.
(3) The condition at Point 6 is a refrigerant bubble point, and there is no subcooled liquid. The condition at Point 5 (inlet to condenser) is a superheated state of a pure refrigerant with $P = P_{con}$ and $T = T_g$.
(4) Pressures in the condenser and the generator ($P_{con}$ and $P_g$) are the same, and evaporator and absorber pressures ($P_{eva}$ and $P_a$) are similarly equal.
(5) The condition at Point 3 (solution inlet to the absorber) is a solution's bubble point specified with the absorber pressure ($P_a$) and a solution concentration of the generator ($x_g$).
(6) Temperatures in the generator ($T_g$), absorber ($T_a$), condenser ($T_{con}$) and evaporator ($T_{eva}$) are specified as a given cycle condition.
(7) The refrigerant gas flow rate ($m_r$) is set to be 1 kg·s$^{-1}$, without loss of generality, and the absorbent vapor is neglected.

The first step of cycle calculations is to obtain $P_{eva}$ and $P_{con}$ as saturated vapor pressures of a pure refrigerant at given temperatures: Bubble-Point P routine (Ness, H C V et al, supra). Then, using a usual TP (Temperature-Pressure) Flash routine (Ness, H C V et al, supra), absorbent compositions, $x_g$ and $x_a$, in the generator and absorber units are calculated. This provides f (flow rate ratio) in eq 17. The thermodynamic properties at Point 3 are determined from the assumption (5): Bubble-Point T routine (Ness, H C V et al, supra). The enthalpy at Point 1 is obtained from eq 19. Enthalpies at all other points are easily calculated with known T, P and compositions. Thus, the necessary quantities for the performance evaluation can be obtained using the listed equations. Cycle performances for the present binary systems are summarized in Example 1, Table 4 with selected thermodynamic quantities, where the specified temperatures for the cycle condition are: $T_g/T_{con}/T_a/T_{eva} = 100/40/30/10°$ C., and $m_r = 1$ kg·s$^{-1}$.

The well-known refrigerant-absorbent pairs, $NH_3/H_2O$ and $H_2O/LiBr$, have also been calculated and are shown in Example 1, Table 4 for comparison. In the case of $NH_3/H_2O$, the absorbent $H_2O$ has a non-negligible vapor pressure at the generator exit, and in practical applications a rectifier (distillation) unit is required in order to separate the refrigerant from absorbent water. The effect of vapor pressure and extra power requirement due to the rectifier have been ignored; thus, the calculated COP is over-estimated for the present performance comparison. For $H_2O/LiBr$, the EOS model was not developed. Instead, empirical correlation diagrams for the thermodynamic properties were employed (temperature-pressure-concentration diagram and enthalpy-temperature diagram in Stoecker and Jones, Refrigeration and Air Conditioning [McGraw-Hill, New York, 1982, 328-350]).

Cycle calculations for an absorption refrigeration cycle may be readily made using the EOS as described herein, but analysis of the results requires a different approach than used in the case of an ordinary vapor compression cycle. In the latter case, a high pressure/temperature refrigerant gas is produced by a vapor compressor, where the thermodynamic process is theoretically a single isentropic step: inlet and exit enthalpies of the compressor are sufficient for describing the compressor work. In the absorption cycle, however, the process of generating the corresponding high pressure/temperature gas is more complicated, and it is necessary to know enthalpies at several different locations as well as refrigerant-absorbent solubility differences at the absorber and generator units (related to the f value), as seen in eqs. 17, 21 and 22.

The condenser and evaporator performance is the same for both cycles at given temperatures, and may be understood based on the latent heat of vaporization (or condensation). In general, the refrigerating effect is the latent heat at the evaporator, which increases with an increase in the temperature difference between $T_c$ and $T_{eva}$. Thus, at a given $T_{eva}$, the latent heat is larger for a refrigerant with a higher $T_c$. In addition, the molar latent heat (J/mol) is generally not so much different among refrigerants at their boiling point (or far away from $T_c$), while the specific latent heat (J/kg) can be significantly different due to a large difference in molar masses. These factors can explain large differences in the calculated refrigerating power $Q_e$.

An absorbent as used in an absorption heating or cooling cycle is desirably a compound that has high solubility for a refrigerant (e.g. water) and also a very high boiling point relative to the refrigerant. Example 1, Table 4 exemplifies the system of water+[emim][BF$_4$], which has COP/f values of 0.525/18.2.

The present invention also provides devices utilizing absorption cycles of the invention. Devices of the invention include, but are not limited to, refrigerators, car air conditioners, residential air conditioners, commercial air conditioners, transport air conditioners, commercial ice machines, transport ice machines, and industrial cooling systems.

Refrigerants and ionic liquids, and methods of use thereof, suitable for use in this invention are also described in U.S. application Ser. No. 11/346,028 and in U.S. application Ser. No. 11/435,352, each of which is incorporated in its entirety as a part hereof for all purposes.

The following examples are presented to illustrate the advantages of the present invention and to assist one of ordinary skill in making and using the same. These examples are not intended in any way otherwise to limit the scope of the disclosure.

General Methods and Materials

1-Ethyl-3-methylimidazolium tetrafluoroborate ([emim][BF$_4$], C$_6$H$_{11}$N$_2$F$_4$B, with a molecular weight of 197.98 g mol$^{-1}$, Lot and Filling Code, 1167450 50705116), was obtained from Fluka Chemika (may be obtained from Sigma-Aldrich, St. Louis, Mo.) with a purity of >97%.
The following nomenclature and abbreviations are used:

$a_i$=generic RK EOS parameter of the i-th species (m$^6$·MPa·mol$^{-2}$)
$b_i$=generic RK EOS parameter of i-th species (m$^3$·mol$^{-1}$)
$C_i$=ideal gas heat capacity coefficients
$C_{pi}^0$=ideal gas heat capacity of i-th species (J·mol$^{-1}$·K$^{-1}$)
COP=coefficient of performance
f=mass flow rate ratio
f(T)=temperature dependent term of binary interaction parameter, $1+\tau_{ij}/T$
$H_i$=enthalpy at point i(J·kg$^{-1}$)
$k_{ij}$, $k_{ji}$, $l_{ij}$, $l_{ji}$=binary interaction parameters
$m_{ij}$=binary interaction parameter
$m_s$=mass flow rate of solution (kg·sec$^{-1}$)
$m_r$=mass flow rate of refrigerant (kg·sec$^{-1}$)
P=pressure (MPa)
$P_{ci}$=critical pressure of i-th species (MPa)
$Q_i$=heat (kW)
R=gas constant (8.31434 m$^3$·Pa·mol$^{-1}$·K$^{-1}$)
$T_{ci}$=critical temperature of i-th species (K)
T=temperature (K)
$V_i$=volume of i-th species (m$^3$)
$\tilde{V}$=molar volume (m$^3$·mol$^{-1}$)
$W_i$=work (kW)
$x_i$=mole fraction of i-th species
α=EOS temperature dependence parameter
$β_k$=coefficient of temperature dependence parameter
ρg=density of gas (kg·m$^{-3}$)
$φ_i$=fugacity coefficient (MPa)
η=heat ratio, output power divided by input power
$τ_{ij}$=binary interaction parameter (K) for temperature dependence term, f(T)
Units
Pa≡Pascal
MPa≡Mega Pascal
mol≡mole
m≡meter
cm≡centimeter
kW≡kilowatt
K≡Kelvin
N≡Newton
J≡Joule
kJ≡kilojoule
kg≡kilogram
mg≡milligram
μg≡microgram
T≡temperature
P≡pressure
mbar≡millibar
min≡minute
°C.≡degrees centigrade
sec≡second Example 1

Absorption Cooling Process

TABLE 1

EOS Constants of Pure Refrigerants and Absorbents.

| Compound | Molar Mass | $T_c$ (K) | $P_c$ (kPa) | $β_0$ | $β_1$ | $β_2$ | $β_3$ |
|---|---|---|---|---|---|---|---|
| NH$_3$ | 17.03 | 405.40 | 11333 | 1.0018 | 0.46017 | −0.06158 | 0.00168 |
| H$_2$O | 18.02 | 647.10 | 22064 | 1.0024 | 0.54254 | −0.08667 | 0.00525 |
| [emim][BF$_4$] | 198.0 | 860.97 | 3553 | 1.0 | 1.05910 | — | — |

TABLE 2

Coefficients for Ideal Gas Heat Capacity
[J · mol$^{-1}$ · K$^{-1}$] in eq 14.

| Compound | $C_0$ | $C_1$ | $C_2$ | $C_3$ |
|---|---|---|---|---|
| NH$_3$ | 27.31 | 0.02383 | 1.707 × 10$^{-5}$ | −1.185 × 10$^{-8}$ |
| H$_2$O | 32.24 | 1.924 × 10$^{-3}$ | 1.055 × 10$^{-5}$ | −3.596 × 10$^{-9}$ |
| [emim][BF$_4$] | −20.91 | 94.28 × 10$^{-2}$ | −6.410 × 10$^{-4}$ | 0.1591 × 10$^{-6}$ |

TABLE 3

Binary Interaction Parameters of Refrigerant-Absorbent Pairs
Determined from Experimental PTx data shown in Example 2.

| Binary Systems (1)/(2) | $l_{12}$ | $l_{21}$ | $m_{12,21}$ | $\tau_{12,21}$ | $\beta_1$ (absorbent) |
|---|---|---|---|---|---|
| [emim][BF$_4$] | −0.0880 | −0.0880 | 0.0313 | 0 | 1.05910 |
| NH$_3$/H$_2$O | −0.316 | −0.316 | −0.0130 | 0 | 0.54254 |

TABLE 4

Comparisons of Theoretical Cycle Performances.[a]

| Binary Systems (1)/(2) | $P_{con}$, $P_g$ kPa | $P_{eva}$, $P_a$ kPa | f | $x_g$ Mass % | $x_a$ mass % | $Q_e$ kW | COP |
|---|---|---|---|---|---|---|---|
| H$_2$O/[emim][BF$_4$] | 7.55 | 1.23 | 18.2 | 98.56 | 93.14 | 2354 | 0.525 |
| NH$_3$/H$_2$O | 1548 | 615 | 2.54 | 59.5 | 36.1 | 1112 | 0.646 |
| H$_2$O/LiBr | 7.38 | 1.23 | 4.08 | 66.3 | 50.0 | 2502 | 0.833 |

[a]Cycle conditions: $T_g/T_{con}/T_a/T_{eva} = 100/40/30/10°$ C., and $m_r = 1$ kg·s$^{-1}$.

Example 2

Solubility of water in 1-ethyl-3-methylimidazolium tetrafluoroborate ([emim][BF$_4$]

Solubility data for [emim][BF$_4$] in water was modeled using the equations of state as described above over a temperature range from 40 to 130° C. and a composition range from 0 to 100 mole percent water in [emim][BF$_4$] (see FIG. 2). The observed data points at 100 and 130° C. are from M. Seiler, et al. (AIChE J. (2004) vol. 50, 2429).

What is claimed is:

1. A composition comprising (a) a mixture that consists essentially of water and one or more hydrofluorocarbons; and (b) at least one ionic liquid that absorbs water, wherein an ionic liquid comprises a fluorinated anion.

2. The composition of claim 1 wherein an ionic liquid comprises a cation selected from the group consisting of the following eleven cations:

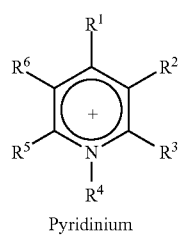
Pyridinium

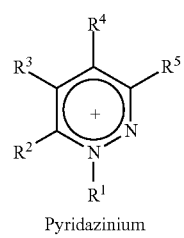
Pyridazinium

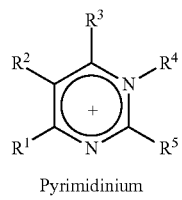
Pyrimidinium

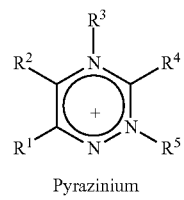
Pyrazinium

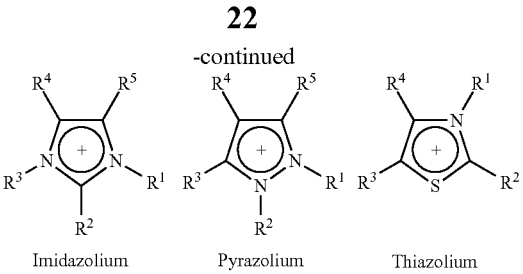
Imidazolium  Pyrazolium  Thiazolium

Oxazolium  Triazolium  Phosphonium

Ammonium wherein $R^1$, $R^2$, $R^3$, $R^4$, $R^5$ and $R^6$ are independently selected from the group consisting of:
(i)
(ii) halogen
(iii) —CH$_3$, —C$_2$H$_5$, or a C$_3$ to C$_{25}$ straight-chain, branched or cyclic alkane or alkene group, optionally substituted with at least one member selected from the group consisting of Cl, Br, F, I, OH, NH$_2$ and SH;
(iv) —CH$_3$, —C$_2$H$_5$, or a C$_3$ to C$_{25}$ straight-chain, branched or cyclic alkane or alkene group comprising one to three heteroatoms selected from the group consisting of O, N, Si and S, and optionally substituted with at least one member selected from the group consisting of Cl, Br, F, I, OH, NH$_2$ and SH;
(v) a C$_6$ to C$_{20}$ unsubstituted aryl group, or a C$_3$ to C$_{25}$ unsubstituted heteroaryl group, having one to three heteroatoms independently selected from the group consisting of O, N, Si and S; and
(vi) a C$_6$ to C$_{25}$ substituted aryl group, or a C$_6$ to C$_{25}$ substituted heteroaryl group, having one to three heteroatoms independently selected from the group consisting of O, N, Si and S; and wherein said substituted aryl or substituted heteroaryl group has one to three substituents independently selected from the group consisting of:
(1) —CH$_3$, —C$_2$H$_5$, or a C$_3$ to C$_{25}$ straight-chain, branched or cyclic alkane or alkene group, optionally substituted with at least one member selected from the group consisting of Cl, Br, F I, OH, NH$_2$ and SH, (2) OH,
(3) $NH_2$, and
(4) SH;

$R^7$, $R^8$, $R^9$ and $R^{10}$ are independently selected from the group consisting of:

(vii) $-CH_3$, $-C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH;

(viii) $-CH_3$, $-C_2H_5$, or a $C_3$ to $C_{25}$ straight-chain, branched or cyclic alkane or alkene group comprising one to three heteroatoms selected from the group consisting of O, N, Si and S, and optionally substituted with at least one member selected from the group consisting of Cl, Br, F, I, OH, $NH_2$ and SH;

(ix) a $C_6$ to $C_{25}$ unsubstituted aryl group, or a $C_6$ to $C_{25}$ unsubstituted heteroaryl group, having one to three heteroatoms independently selected from the group consisting of O, N, Si and S; and (x) a $C_6$ to $C_{25}$ substituted aryl group, a or $C_6$ to $C_{25}$ substituted heteroaryl group, having one to three heteroatoms independently selected from the group consisting of O, N, Si and S; and wherein said substituted aryl or substituted heteroaryl group has one to three substituents independently selected from the group consisting of:

(1) $-CH_3$, $-C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH,
(2) OH,
(3) $NH_2$, and
(4) SH; and wherein, optionally, at least two of $R^1$, $R^2$, $R^3$, $R^4$, $R^5$, $R^6$, $R^7$, $R^8$, $R^9$ and $R^{10}$ together form a cyclic or bicyclic alkanyl or alkenyl group.

3. The composition of claim 2 wherein an ionic liquid comprises an imidazolium cation.

4. The composition of claim 3 wherein the cation is 1-ethyl-3-methylimidazolium.

5. The composition of claim 2 wherein at least one of $R^1$, $R^2$, $R^3$, $R^4$, $R^5$, $R^6$, $R^7$, $R^8$, $R^9$ and $R^{10}$ comprises F.

6. The composition of claim 1 wherein an ionic liquid is 1-ethyl-3-methylimidazolium tetrafluoroborate.

7. The composition of claim 1 wherein an ionic liquid comprises a fluorinated cation.

8. The composition of claim 1 wherein, over a temperature range of from about 5° C. to about 200° C., the concentration of water in the composition is in the range of from about 1% to about 99% by weight of the combined weight of water and an ionic liquid therein.

9. The composition of claim 1 wherein a hydrofluorocarbon is selected from the group consisting of HFC-32, HFC-125, HFC-134, HFC-134a, HFC-143a, HFC-152a, and HFC-161.

10. The composition of claim 5 wherein a hydrofluorocarbon is selected from the group consisting of HFC-32, HFC-125, HFC-134, HFC-134a, HFC-143a, HFC-152a, and HFC-161.

11. The composition of claim 1 wherein a fluorinated anion is selected from the group consisting of include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$; and $F^-$.

12. The composition of claim 2 wherein a fluorinated anion is selected from the group consisting of include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_{21}CF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$; and $F^-$.

13. The composition of claim 7 wherein a fluorinated anion is selected from the group consisting of include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]$, $[CF_3CF_2OCF_2CF_2SO_3]$, $[(CF_2HCF_2SO_2)_2N]^-$, $[(CF_3CFHCF_2SO_2)_2N]^-$; and $F^-$.

* * * * *